United States Patent Office 3,223,943

Patented Dec. 14, 1965

3,223,943

LOCAL OSCILLATOR CONTROLLING SYSTEMS USING QUANTIZING MEANS

Marc-Jean Dumaire and Jean-Pierre Vasseur, Paris, France, assignors to C.S.F.-Compagnie générale de telegraphie Sans Fil, a corporation of France Filed June 21, 1962, Ser. No. 204,091
Claims priority, application France, June 29, 1961, 866,423, Patent 1,301,861; Feb. 22, 1962, 888,810, Patent 81,193
7 Claims. (Cl. 331—17)

The present invention relates to local oscillator control systems and more particularly to such systems as used in radio links.

In the operation of radio links, it occurs for various reasons, that the phase of the received wave varies. When the receiver comprises a local oscillator, it is necessary to keep constant the frequency of the intermediate wave derived from the mixing of the local signal and the incident signal. This may be achieved by controlling the phase of the local oscillator by the phase of the incident wave.

The control of the phase of the local oscillator is generally effected by means of a phase discriminator which receives the local wave and the incident wave and provides an error voltage which controls the local oscillator through a servo-mechanism, if the oscillator is provided with a mechanical frequency control, such as a variable capacitor, or directly, in the case of electronically tunable tubes.

Since radio transmission is subjected to accidental interruptions and to interruptions due to jamming, it occurs that, following such an interruption, the local oscillator has no longer the desired phase, which makes manual re-adjustments necessary, should the error signal cease to be available for too long a period of time.

In order to avoid this drawback, the last error signal preceding the interruption may be stored in a storage device, for example in a delay line. Such circuits are, however, comparatively complex, and the storage period thus made available is, in addition, frequently too limited.

It is an object of the invention to provide a system for controlling the local oscillator of the type described, which does not present such a drawback.

A system according to the invention comprises, in the feedback loop controlling the local oscillator and comprising the phase discriminator mentioned above, means for quantizing the error voltage into a quantized magnitude, means for converting again the quantized magnitude thus obtained into an error voltage and means for making said quantizing means inoperative for the time interval when the incident wave has a level lower than a predetermined threshold, the error voltage thus remaining unchanged in the meantime.

The invention will be best understood from the following description and appended drawing wherein.

Figure 1:
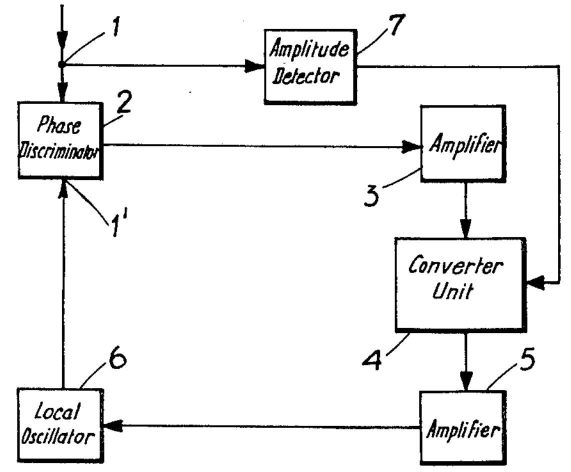
FIG. 1 is a block diagram of a system according to the invention.
Figure 4A:
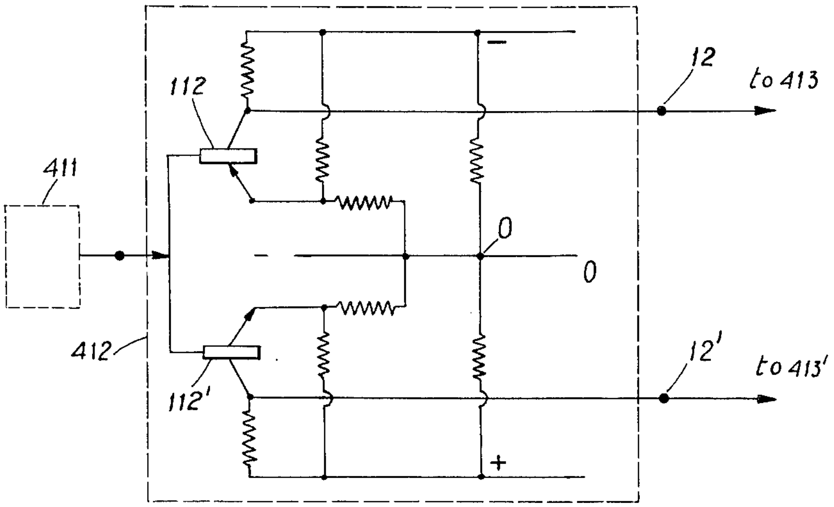
Figure 4B:
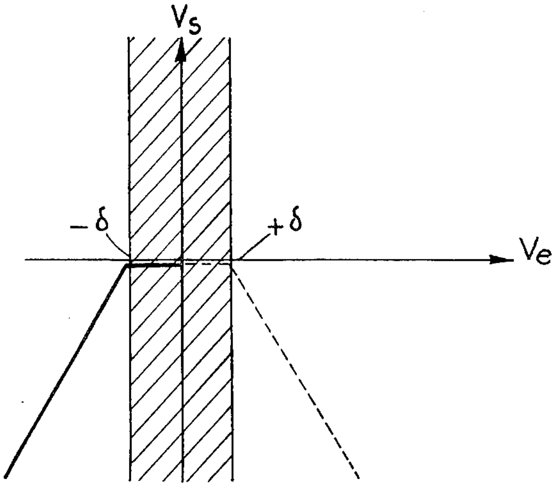
Figures 5, 5A, 5B, 5C, 5D, 5E, 5F:
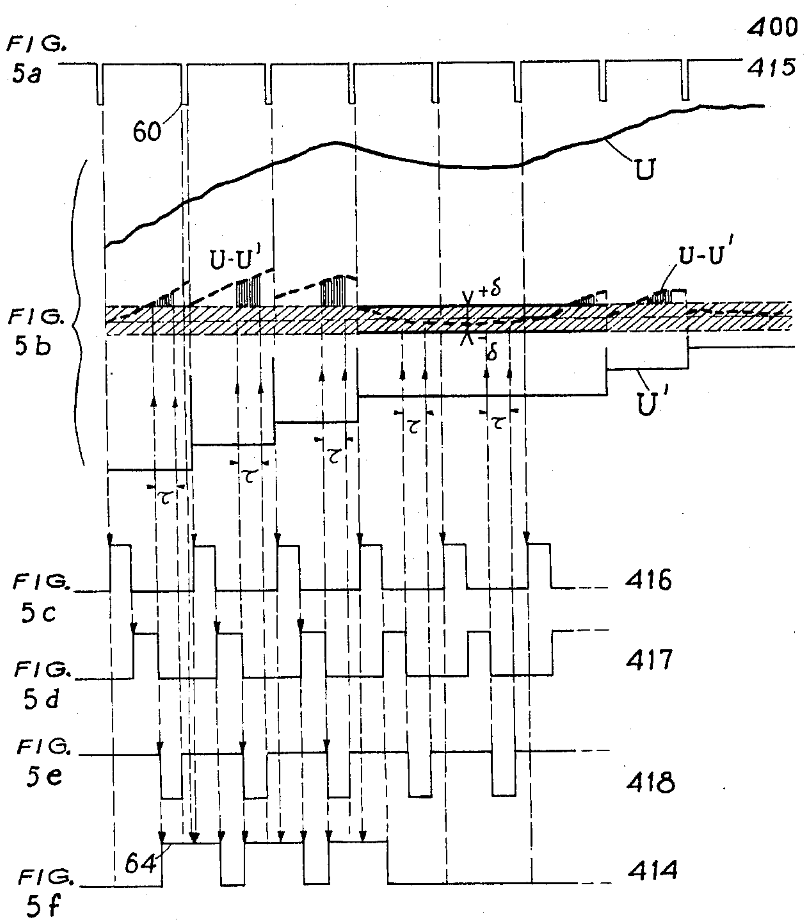

FIGS. 4*a* and 4*b* are, respectively, a wiring diagram of the threshold amplifier and a response curve of the amplifier; and FIG. 5 represents the signals at various points of the diagram of FIG. 1.

Referring to FIG. 1, the system comprises a phase discriminator 2, a first input of which receives the incident signal, while its second input 1' receives the signal derived from a local oscillator 6. The output of discriminator 2 is coupled, through a D.C. amplifier 3, to the input of a converter unit 4 including an analog-to-digital converter and a digital-to-analog converter, which will be described in more detail with reference to FIGS. 2 and 3. The output of unit 4 is connected to the input of the local oscillator 6, through an amplifier 5.

An amplitude detector 7 is connected between input 1 and unit 4.

The operation of the assembly is as follows:

The incident signal and the signal from the local oscillator 6 which are applied to the phase discriminator 2, give rise at the output thereof to an error voltage U, which depends upon th phase difference $\phi$ between these two signals. In the steady state, this voltage is normally constant, since it depends only on the distance between the transmitter and the receiver, the phase of the local oscillator being constant. This volatge is amplified in amplifier 3 and quantized by unit 4 to provide a quantized voltage U'. When voltage U varies, voltage U' varies by steps.

Voltage U' is applied to amplifier 5 and is used to control the frequency of oscillator 6. When voltage U is constant, voltage U' remains constant and oscillator 6 keeps oscillating at the same frequency.

When phase $\phi$ varies, voltage U varies and is followed by a stepwise variation of voltage U', the frequency of oscillator 6 being thus corrected in the necessary sense.

If the incident wave reaches a level lower than a predetermined one, detector 7 operates, the converter unit 4 stops operating and voltage U', instead of reflecting the variations of voltage U, keeps the value it had the moment the incident wave reached the above mentioned predetermined value.

Figure 2:
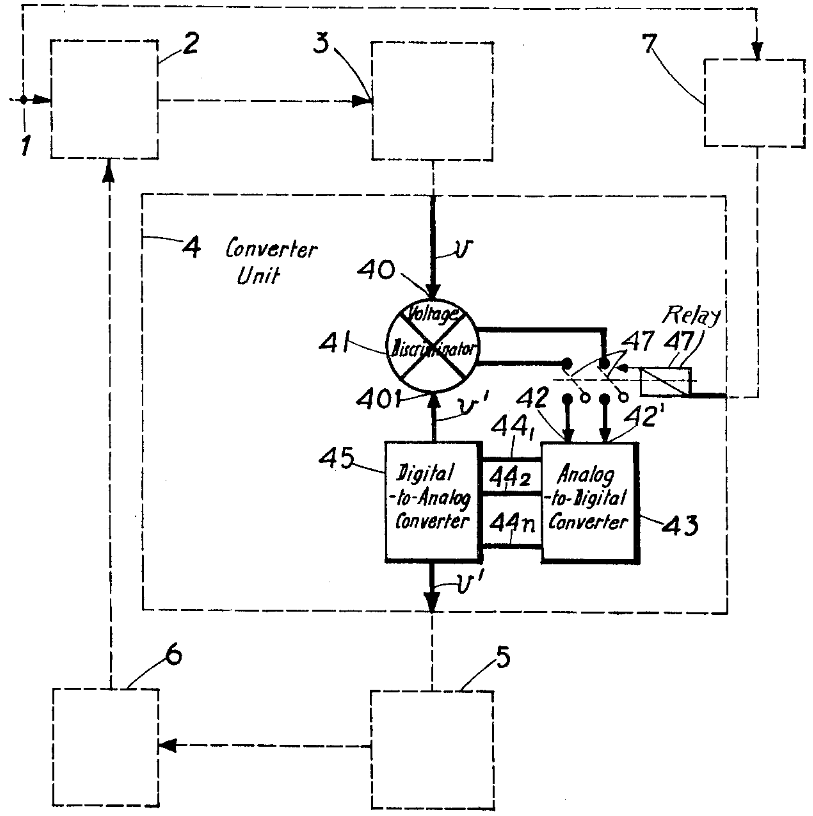
FIG. 2 is a block diagram of the converter unit used in the system of FIG. 1.

FIG. 2 illustrates in more detail an embodiment of unit 4. The unit comprises a voltage comparator 41 having two inputs 40 and 401. Input 40 is coupled to the outputs of amplifier 3. Input 401 is coupled to one output of a digital-to-analog converter 45. Comparator 41 has two outputs, which are respectively connected to the counting input 42 and to the counting backward input 42' of a digital counter 43, which is, for example, a binary counter.

Counter 43 has *n* outputs $44_1$ through $44_n$ which are respectively connected to the *n* inputs of the digital-to-analog converter 45. In addition to the output coupled to discriminator 41, converter 45 has another output which is connected through amplifier 5 to the local oscillator 6. A switch, actuated by a relay 47 which is controlled by the amplitude detector 7, is connected between discriminator 41 and counter 43.

The operation of unit 4 is as follows:

Voltage U is applied to the input 40 of discriminator 41, while input 401 thereof receives voltage U', which has been quantized in the loop connecting the output of discriminator 41 to its input 401.

The voltage difference U–U' may be positive, negative or nil. If this difference is nil, the count of the counter 43 does, of course, not vary. Should, however, voltage U exceed at a given instant the value of U' corresponding to the count of counter 43 at that instant, the count of counter 43 advances by one step. Voltage U′ is increased and the local oscillator frequency accordingly modified. The contrary occurs if, at a given instant, U′ exceeds the value of U.

Figure 3:
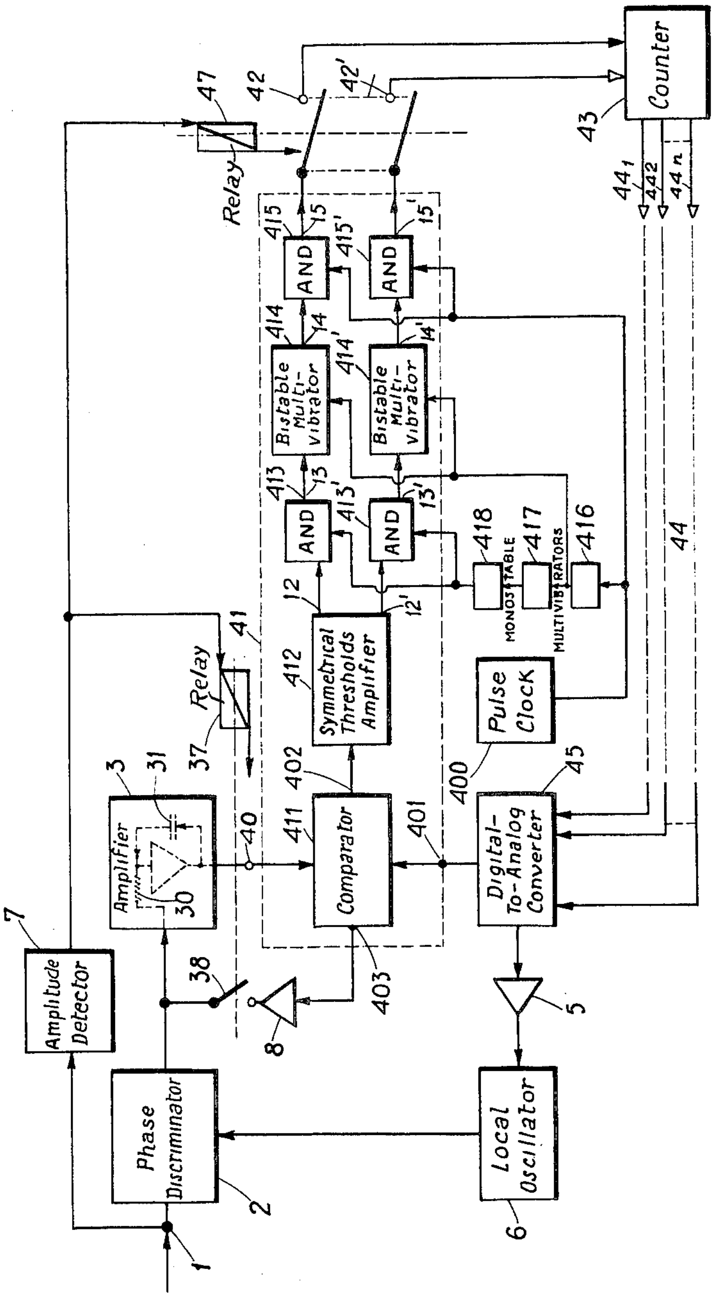
FIG. 3 is a more detailed block diagram of the system of FIG. 1.

FIG. 3 represents the same circuit as FIG. 2, with discriminator 41 shown in more detail. Also a capacitor 31 is connected across amplifier 3, a resistance 30 being inserted between the output of phase discriminator 2 and the input of amplifier 3; an amplifier 8 is connected between output 403 of discriminator 41, which is the same as output 402, and the input of amplifier 3, through a switch 38 controlled by a relay 37 which is in turn controlled by amplitude detector 7.

Discriminator 41 comprises a voltage comparator 411, the inputs of which are the inputs 40 and 401 of discriminator 41. One of the outputs of comparator 411 is the already mentioned output 403. The comparator also comprises an output 402.

The output 402 of comparator 411 is connected to a threshold device 412 of a type well known in the art and one embodiment of which is shown in FIG. 4*a*. It comprises essentially two symmetrical threshold amplifiers 112 and 112′. One of these amplifiers may be a P–N–P transistor and the other a N–P–N transistor, the bases of the transistors being connected to the output 402 of comparator 411 and their emitters grounded through resistors determining the threshold.

The outputs 12 and 12′ of the threshold device 412 are respectively connected to the inputs of two AND-gates 413 and 413′, whose second inputs are connected to a monostable multivibrator 418, which is the last one of three cascaded monostable multivibrators 416, 417 and 418. Multivibrator 416 is controlled by a clock or pulse generator 400.

The respective outputs 13 and 13′ of the AND-gates 413 and 413′ are respectively coupled to the inputs of bistable multivibrators 414 and 414′. These have their respective second inputs connected to multivibrator 416.

The outputs 14 and 14′ of multivibrators 414 and 414′ are respectively connected to the inputs of the AND-gates 415 and 415′, whose further inputs are connected to clock 400.

The outputs 15 and 15′ of the AND-gates 415 and 415′ are respectively coupled, through switches 42 and 42′, to the counting and to the counting backward inputs of counter 43. Switches 42 and 42′ are controlled by the amplitude detector 7.

The operation of the feedback loop including amplifier 3 will be first described.

Resistor 30, capacitor 31 and amplifier 3 perform an integration of the error voltage. This is desirable for filtering the variations of the amplitude of the incoming signal which may be too rapid. It will be advantageous, in order to reduce the size of the capacitor 31, to connect the latter across amplifier 3, as shown in FIG. 3.

The discharge of capacitor 31 at the instants of the interruption of the radioconnection gives rise to a phase rotation, which is too rapid to cause the counter to advance by one a step in one direction or the other. However, at the moment the connection is re-established, capacitor 31 may have been charged or discharged from the moment of the interruption, so that it can happen that the voltage applied to unit 4 is sufficiently high to advance the count by several steps in one direction or the other, which might be detrimental to the desired end.

It is thus necessary to maintain the charge of capacitor 31 during the interruption at the level it had before the interruption. This is achieved by means of relay 37 and amplifier 8. When the connection is interrupted, the detector 7 actuates relay 37. The latter closes switch 38 and voltage $U'_0$ existing before the interruptions is applied to amplifier 3 through amplifier 8.

It follows that the voltage across capacitor 31 remains substantially constant during the interruption; when the connection is restored, relay 37 opens switch 38 and the operation is resumed as before.

The operation of the assembly 41 will now be described.

The voltage comparator compares voltage U and the quantized voltage U′ and provides voltage U–U′, which is either positive or negative, unless U′ and U are equal.

Voltage U will generally vary by less than the voltage corresponding to one step of counter 43, between two successive pulses, as defined, for example, by clock 400. However, the counter should not, if hunting is to be avoided, operate for any difference U–U′. To this effect the double threshold unit 412 has been provided. The latter passes the voltage U–U′ through amplifiers 112 and 112′ only if it is lower than a predetermined voltage $-\delta$ or higher than a predetermined voltage $+\delta$, symbolically shown in FIG. 4*b*. When voltage U–U′ is comprised between the symmetrical threshold $-\delta$ and $+\delta$, the output voltage is zero.

Thus, according to whether output 12 or 12′ is energized or none of these is energized, gate 413, gate 413′, or none of them is made conductive. The output signals of AND–gates 413 and 413′, are applied to multivibrators 414 or 414′, the latter passing their output signals to gates 415 and 415′ respectively. The respective outputs of gates 415 and 415′ are counted by counter 43, unless the incoming signal applied to input 1 is too low, in which case switch 42–42′ is operated by relay 47 and the output of counter 43 keeps unchanged until switch 42–42′ is again closed.

It will now be explained how the duration of each step of the counter, i.e. the frequency with which counter 43 is actuated, is determined. This will be done with particular reference to FIGS. 5*a* to 5*f*.

Pulse generator 400 provides pulses 60 with a predetermined repetition frequency and these pulses are applied, with the same frequency, to the AND–gates 415 and 415′, making them conductive.

In the same time pulses 60 trip the monostable multivibrator 416 into its unstable state. Multivibrator 416 performs a twofold function: (*a*) it trips multivibrators 414 and 414′; (*b*) it trips into its unstable state the monostable multivibrator 417.

The monostable multivibrator 417 trips into its unstable state multivibrator 418, which actuates the AND–gates 413 and 413′. As may be readily seen from FIGS. 5*a* to 5*f*, this results in voltage signals 63 being applied to the corresponding bistable multivibrator only during short time intervals $\tau$ which are situated in the intermediate portion of each voltage step. Thus, any action of the spurious voltages is eliminated. The output signal 64 of the multivibrator 414 or 414′ is applied to the AND–gate 415 or 415′ and is passed as a short pulse, having the same duration as pulse 60, to counter 43. Then multivibrator 414 or 414′ is again tripped by pulse 66.

The count of counter 43 is applied to a conventional digital-to-analog converter 45 which, through an amplifier 5, acts on the local oscillator 6 to adjust the frequency thereof.

In normal operation the count of counter 43 constantly follows the fluctuation of the output of discriminator 2. However, if, due to the action of the amplitude detector, switch 42–42′ is opened, the count of counter 43 prevailing at that moment keeps unchanged and so does the frequency of the local oscillator 6.

Of course the invention is not limited to the embodiment described which has been given solely by way of example.

What is claimed is:

1. An automatic frequency control system for controlling the phase of a local oscillator by the phase of an incident signal, comprising: means for providing error signals proportional to the instantaneous phase difference between said incident signal and the signal provided by said local oscillator; analog-to-digital converter means for converting into a quantized magnitude said error signals and storing said magnitude; digital-to-analog converter means for converting said quantized magnitude into a signal for frequency controlling said local oscillator; and means responsive to the amplitude of said incident signal for blocking said analog-to-digital converter on its last count upon said amplitude level becoming lower than a predetermined threshold and for causing said analog-to-digital converter to resume its count upon said amplitude becoming again at least equal to said threshold.

2. An automatic frequency control system for controlling the phase of a local oscillator by the phase of an incident signal, comprising: means for providing error signals proportional to the instantaneous phase difference between said incident signal and the signal provided by said local oscillator and means for integrating said signals to provide integrated error signals; analog-to-digital converter means for converting into a quantized magnitude said integrated error signals and storing said magnitude; digital-to-analog converter means for converting said quantized magnitude into a signal for frequency controlling said local oscillator and means responsive to the amplitude of said incident signal for blocking said analog-to-digital converter on its last count upon said amplitude level becoming lower than a predetermined threshold and for causing said analog-to-digital converter to resume its count upon said amplitude becoming again at least equal to said threshold.

3. An automatic frequency control system for controlling the phase of a local oscillator by the phase of an incident signal comprising: means for providing an error signal proportional to the instantaneous phase difference between said incident signal and the signal provided by said local oscillator, said means having an otuput; forward and backward counting means coupled to said output and having an output; digital-to-analog converter means, having an input coupled to said counter means output and an output coupled to said local oscillator for controlling the frequency thereof; and means responsive to the amplitude of said incident signal for switching off said counter upon the amplitude level of said incoming signal becoming lower than a predetermined threshold and for switching it in again upon said amplitude becoming again at least equal to said threshold.

4. An automatic frequency control system for controlling the phase of a local oscillator by the phase of an incident signal comprising: means for providing an error voltage proportional to the instantaneous phase difference between said incident signal and the signal provided by said local oscillator, said means having an output; a voltage comparator, having a first input coupled to said output, a second input and an output; forward and backward counting means having an input and an output; threshold means coupled to said voltage comparator output for deriving therefrom a voltage; means for deriving from said voltage a signal and for applying it to said counter input; means responsive to the amplitude of said incident signal for switching off said counter upon the amplitude level of said incoming signal becoming lower than a predetermined level and for switching it in again upon said amplitude becoming again at least equal to said level; and digital-to-analog converter means having an input coupled to said counter means output, an output coupled to said local oscillator for controlling the frequency thereof and a further ouput coupled to said second input of said voltage comparator.

5. An automatic frequency control system for controlling the phase of a local oscillator by the phase of an incident signal comprising: means for providing an error voltage proportional to the instantaneous phase difference between said incident signal and the signal provided by said local oscillator said means having an output; a voltage comparator, having a first input coupled to said output, a second input and an output; a feedback loop between said output and said first input, said loop including amplifying means and integrating means; forward and backward counting means having an input and an output; threshold means coupled to said voltage comparator output for deriving therefrom a voltage; means for deriving from said voltage a pulsed signal and applying it to said counter input; means responsive to the amplitude of said incident signal for switching off said counter upon the amplitude level of said incoming signal becoming lower than a predetermined threshold and for switching it in again upon said amplitude becoming again at least equal to said threshold; and digital-to-analog converter means having an input, coupled to said counter means output, and an output, coupled to said local oscillator, for controlling the frequency thereof and a further output coupled to said second input of said voltage comparator.

6. An automatic frequency control system for controlling the phase of a local oscillator by the phase of an incident signal, comprising: means for providing an error voltage proportional to the instantaneous phase difference between said incident signal and the signal provided by said local oscilllator, said means having an output; a voltage comparator, having a first input coupled to said output, a second input and an output; forward and backward counting means having an input and an output; threshold means coupled to said voltage comparator output for deriving therefrom voltage signals; means for deriving from said voltage signals further signals at predetermined periodically spaced time intervals; means for deriving pulses from said further signals and applying them to said counter input; means responsive to the amplitude of said incident signal for switching off said counter upon the amplitude level of said incoming signal becoming lower than a predetermined threshold and for switching it in again upon said amplitude becoming again at least equal to said threshold; and digital-to-analog converter means having an input coupled to said counter means output, an output coupled to said local oscillator for controlling the frequency thereof and a further output coupled to said second input of said voltage comparator.

7. An automatic frequency control system for controlling the phase of a local oscillator by the phase of an incoming signal, comprising: means for providing an error voltage proportional to the instantaneous phase difference between said incoming signal and the signal provided by said local oscillator, said means having an output; a voltage comparator, having a first input coupled to said output, a second input and an output; forward and backward counting means having an input and an output; threshold means coupled to said voltage comparator output for deriving therefrom a voltage, having a first output for positive voltages and a second output for negative voltages; two first AND-gates having first inputs, respectively coupled to said first and second outputs of said threshold means, respective second inputs and respective outputs; two bistable multivibrators having first control inputs, respectively coupled to said AND-gate outputs, second control inputs and respective outputs; further AND-gates having first inputs coupled to said multivibrator respective outputs, respective second control inputs and respective outputs coupled to said counter input, respectively for causing the same to count and to count backwards; a pulse source for providing pulses with a predetermined frequency; a plurality of monostable multivibrators, comprising a first and a last multivibrator and having respective control inputs; said generator being coupled to the control input of said first multivibrator and to said second control inputs of said further AND-gates, said multivibrators being cascade connected for controlling each other, said last multivibrator being coupled to the control inputs of said first AND-gates and said first multivibrator being coupled to said second control input of said bistable multivibrator; means responsive to the amplitude level of said incoming signal for disconnecting said counter from said further AND-gate outputs upon said level becoming lower than a predetermined threshold and for connecting it again upon said amplitude becoming again at least equal to said threshold; and digital-to-analog converter means, having an input coupled to said counter means output, an output coupled to said local oscillator for controlling the frequency thereof and a further output coupled to said second input of said voltage comparator.

References Cited by the Examiner

UNITED STATES PATENTS

| | | | | |
|---|---|---|---|---|
| 2,777,055 | 1/1957 | Goldberg | 324—433 | X |
| 2,951,150 | 8/1960 | Rennenkampf | 325—420 | X |
| 2,976,411 | 3/1961 | Kahn | 325—423 | X |

DAVID G. REDINBAUGH, *Primary Examiner.*